US008428607B2

(12) United States Patent
Nan

(10) Patent No.: US 8,428,607 B2
(45) Date of Patent: Apr. 23, 2013

(54) RELAYS IN TELECOMMUNICATIONS NETWORKS

(75) Inventor: MingKai Nan, Beijing (CN)

(73) Assignee: Vodafone IP Licensing Limited, Newbury, Berkshire (GB)

(*) Notice: Subject to any disclaimer, the term of this patent is extended or adjusted under 35 U.S.C. 154(b) by 460 days.

(21) Appl. No.: 12/799,075

(22) Filed: Apr. 16, 2010

(65) Prior Publication Data
US 2010/0297936 A1 Nov. 25, 2010

(30) Foreign Application Priority Data

Apr. 16, 2009 (GB) .................................. 0906495.7
Apr. 30, 2009 (GB) .................................. 0907429.5

(51) Int. Cl.
H04W 72/04 (2009.01)
H04W 72/02 (2009.01)
(52) U.S. Cl.
USPC ............... 455/452.1; 455/509; 455/7; 455/16
(58) Field of Classification Search .................. 455/450, 455/452.1, 509, 422.1, 452.2, 453, 446, 447, 455/7, 11.1, 445, 16, 24
See application file for complete search history.

(56) References Cited

U.S. PATENT DOCUMENTS

| 2008/0080436 | A1* | 4/2008 | Sandhu et al. | 370/338 |
| 2008/0107091 | A1* | 5/2008 | Ramachandran | 370/338 |
| 2008/0220790 | A1* | 9/2008 | Cai et al. | 455/450 |

FOREIGN PATENT DOCUMENTS

EP 2 227 058 A2 9/2010

OTHER PUBLICATIONS

Vodafone et al., "Type II relay enhancement by resource reuse" 3GPP Draft; R1-091967, 3$^{rd}$ Generation Partnership Project (3GPP), Mobile Competence Centre; 650, Route Des Lucioles; F-06921 Sophia-Antipolis Cedex; France, No. San Francisco, USA; 20090502, XP050339439, May 4, 2009-May 8, 2009.
ZTE: "Comparison of Type 1 Relay and L2 Cooperative Relay", 3GPP Draft; R1-091423 Comparison of Type 1 Relay and L2 Cooperative Relay, 3$^{rd}$ Generation Partnership Project (3GPP), Mobile Competence Centre; 650, Route Des Lucioles; F-06921 Sophia-Antipolis Cedex; France, No. Seoul, Korea; 20090317, XP050339003 Mar. 23, 2009-Mar. 27, 2009.
Texas Instruments: "On the design of relay node for LTE-advanced" 3GPP Draft; R1-090593, 3$^{rd}$ Generation Partnership Project (3GPP), Mobile Competence Centre; 650, Route Des Lucioles; F-06921 Sophia-Antipolis Cedex; France, No. Athens, Greece; 20090203, XP050318480, Feb. 9, 2009-Feb. 13, 2009.

(Continued)

Primary Examiner — John J Lee
(74) Attorney, Agent, or Firm — Muirhead and Saturnelli, LLC

(57) ABSTRACT

In a telecommunications network including a plurality of mobile terminals in communication with a network base station, and a plurality of relay nodes configured to assist the base station with data transmissions between the base station and one or more of said plurality of mobile terminals, a method of enabling communication resource reuse amongst the plurality of said relay nodes, the method comprising: predefining a plurality of communication resource sets, each resource set comprising one or more communication resource elements, the communication resource sets arranged so that each relay node can receive data in a predefined receiving resource set and transmit data in a predefined transmission resource set; determining which of two or more relay nodes are spatially separated from one another; and configuring at least two of the two or more spatially separated relay nodes to use the same communication resource sets.

17 Claims, 8 Drawing Sheets

OTHER PUBLICATIONS

3GPP TS 36.300 V8.8.0 (Mar. 2009), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 157 pages.

* cited by examiner

RELAYS IN TELECOMMUNICATIONS NETWORKS

TECHNICAL FIELD

The present invention relates to increasing the efficiency of relays in telecommunications networks. More particularly the present invention relates to scheduling schemes for relays in telecommunications networks, particularly LTE/SAE networks.

BACKGROUND

Relays are used in telecommunications networks to not only forward signals between mobile terminals and the core network, but to add power to the signal. An equivalent term for a relay is a repeater. These are employed in various types of telecommunication systems, including the Long Term Evolution (LTE)/System Architecture Evolution (SAE) currently being developed by the "3rd Generation Partnership Project" (3GPP). In this regard, Long Term Evolution (LTE) is an advanced version of UMTS that uses E-UTRA (Evolved Universal Terrestrial Radio Access), and which employs OFDMA (Orthogonal Frequency Division Multiple Access) on the downlink and SC-FDMA (Single Carrier Frequency Division Multiple Access) on the uplink.

The Radio Access Network component of the LTE/SAE is called the E-UTRAN, which comprises eNode Bs (eNBs). The eNBs provide both user plane and control plane (RRC) protocol terminations towards the mobile terminals (UEs) in the network. The eNBs are interconnected with each other by means of the X2 interface, and are also connected by means of the S1 interface to the EPC (Evolved Packet Core), more specifically to the MME (Mobility Management Entity) by means of the S1-MME and to the Serving Gateway (S-GW) by means of the S1-U. These are the channels over which communications are made in the network.

According to 3GPP TS 36.300, there is a functional split between the different elements of the LTE network, which is illustrated in FIG. 1. In particular, it is to be noted that eNBs control the dynamic allocation of resources (i.e. scheduling) to the UE in both the uplink and downlink.

Transmissions over such wireless uplink and downlink channels are subject to errors, for example due to receiver noise and unpredictable interference variations. Therefore, virtually all wireless communications systems employ some form of Forward Error Correction (FEC). The basic principle of forward error-correcting coding is to introduce redundancy in the transmitted signal. This is achieved by adding parity bits to the information bits prior to transmission (alternatively, the transmission could consists of parity bits alone, depending on the coding scheme used). In a further variation the parity bits may be "punctured" by removing some of the parity bits after encoding with an error correction code. The parity bits are computed from the information bits using a method given by the coding structure used. Thus, the number of bits transmitted over the channel is larger than the number of original information bits and a certain amount of redundancy has been introduced in the transmitted signal.

Another approach to handle transmissions errors is to use Automatic Repeat Request (ARQ). In an ARQ scheme, the receiver uses an error-detecting code, typically a Cyclic Redundancy Check (CRC), to detect if the received packet is in error or not. If no error is detected in the received data packet, the received data is declared error-free and the transmitter is notified by sending a positive acknowledgment (ACK). On the other hand, if an error is detected, the receiver discards the received data and notifies the transmitter via a return channel by sending a negative acknowledgment (NAK). In response to a NAK, the transmitter retransmits the same information.

Hybrid ARQ (HARQ) is a combination of forward error-correcting coding and ARQ. HARQ uses forward error correcting codes to correct a subset of all errors and relies on error detection to detect uncorrectable errors. Erroneously received packets are discarded and the receiver requests retransmissions of corrupted packets.

Whilst these techniques do improve the transmission efficiency, there is still room for improvement. This is particularly the case in modern mobile communications networks, where users are demanding higher data rates. At present, typically only those mobile terminals that are in close proximity to a base station (eNB) can achieve a high data rate, as interference affects the data rate as the distance between the base station and the user terminal increases.

A further problem for LTE networks is that since LTE needs to be compatible with both LTE compatible terminals and legacy terminals (such as Rel-8 terminals to which relays are transparent), there is a challenge to integrate relays in such a network environment without unduly increasing network signalling.

The use of relay nodes has been proposed to distribute the data rate more evenly in a cell served by a particular base station. This approach uses one or more relays for a single transmission. Whilst such a relay system can greatly increase the data throughput, an inherent problem with relay nodes (RN) is that in most situations, a given node cannot simultaneously transmit and receive at the same frequency band, due to the transmitting and receiving antennas not being well separated. Therefore each RN is not able to listen while transmitting, and vice versa, which introduces restrictions on their operation. There are now two types of relays defined in LTE A study: Type I relay has its own cell ID, and therefore deployed as a separate cell while using donor cell resources for backhauling; Type II relay doesn't have its own ID, and will therefore not introduce any new cell perceived by a UE.

The L2 transparent relay has been studied in 3GPP RAN1 as a candidate technology for LTE Advanced. LTE-Advanced extends LTE Rel-8 with, inter alia, support for relaying as a tool to improve the coverage of high data rates, group mobility, the cell-edge throughput and/or to provide coverage in new areas. In this regard, the discussions have been in relation to potentially introducing a type of transparent L2 relay. The relay is ideally transparent in order to be backward compatible with Rel-8 UEs.

In the context of the proposed type II transparent relay, the RN will be properly located so that the eNB-RN link is of good quality and preferably also to improve an area not well covered by the donor eNB. The RN monitors the signalling exchange between the donor eNB and the targeted UEs, so that the RN is aware of scheduling information and HARQ acknowledgement information exchanged between a UE and the donor eNB. The RN's good geometry in the donor eNB cell enables it to decode at the early phase of a HARQ process for targeted relay UEs. The RN will then be able to contribute in later HARQ transmissions by synchronized retransmission for the UE with the eNB. In this way, the RN effectively increases the signal strength transmitted between eNB and UE. As a transparent relay (i.e. to the UE), the RN does not send Cell specific Reference Signal (CRS) and therefore does not have any physical cell identity. In other word, the RN behaves like a $3^{rd}$ party "agent" intercepting communications between UE and eNB, and trying to help the communication by participating in the HARQ retransmissions in uplink or downlink or both.

In the context of this type of relay, in the downlink a relay UE will see, in a sub-frame where HARQ retransmission occurs, the control symbols from eNB and PDSCH (Physical Downlink Shared Channel) symbols from RN or from both RN and eNB. Accordingly, the time-frequency resources need to be synchronized for the RN, donor eNB and UE (i.e. the transmission time and frequency carriers need to be the same at retransmission). Similarly such synchronization needs to be maintained in the uplink. A method of achieving synchronisation in retransmission for the RN with the eNB (in downlink) or with the UE (in uplink) by pre-scheduling for synchronous HARQ retransmission and the use of UE specific reference signal for demodulation is described in detail in European patent application 10155254.5.

Synchronous HARQ transmission means that once the first HARQ transmission is decided, later HARQ retransmissions will follow a pre-defined pattern in the time-frequency resource plane. That means, to schedule such synchronous HARQ transmission, the eNB at (or before) the first transmission also effectively schedules the subsequent retransmissions for that HARQ process in pre-arranged resources obeying a common HARQ retransmission pattern known also by the RN, so that the RN, once having decoded the data at the early phase of the HARQ transmission, can pre-schedule exactly the same HARQ retransmission at the same time-frequency resources (i.e. identically to the schedule planned at eNB).

A TDM (Time Division Mode) constraint applies to this type of transparent relay, because the RN should not listen and transmit at the same time for a given time-frequency resource due to difficulty in antenna isolation for the transmitting and receiving directions at the RN. This TDM constraint therefore requires that the RN be in receiving mode in the Relay sub-frame where the first HARQ transmission(s) is/are scheduled, and to be in transmitting mode in the sub-frame where retransmission is scheduled the RN. To meet such TDM constraints, sub-frame patterns should be designed so that in a defined set of sub-frames where the RN is listening (i.e. in the RN Receiving Sub-Frame (R-R-SF) set), and in a set of subsequent sub-frames where the RN is transmitting (i.e. the RN Transmitting Sub-Frames (R-T-SF) set) the transmitting and receiving sub-frames occur in a fixed pattern, typically with a period corresponding to the HARQ retransmission interval (i.e. typically greater than Round Trip Time). For the TDM constraint, the R-R-SF set shall not overlap with the R-T-SF set.

The design of sub frame patterns for R-R-SF and R-T-SF depend upon planning issues such as how much resources can be used for relay assisted traffic. In particular, it has been advantageously determined that valid sub-frame patterns depend on both the set of sub-frames selected for R-R-SF and the maximum number of HARQ transmission (M) for RFT.

The use of relays can undesirably cause communication resource waste due to the potential for relay nodes to interfere with each other. It is therefore desirable to devise a means for reducing this resource waste and improve data transmission rates in mobile networks.

SUMMARY OF THE INVENTION

According to a first aspect the system described herein provides, in a telecommunications network including a plurality of mobile terminals in communication with a network base station, and a plurality of relay nodes configured to assist the base station with data transmissions between the base station and one or more of said plurality of mobile terminals, a method of enabling communication resource reuse amongst the plurality of said relay nodes, the method comprising: predefining a plurality of communication resource sets, each resource set comprising one or more communication resource elements, the communication resource sets arranged so that each relay node can receive data in a predefined receiving resource set and transmit data in a predefined transmission resource set; determining which of two or more relay nodes are spatially separated from one another; and configuring at least two of the two or more spatially separated relay nodes to use the same communication resource sets.

This aspect of the system described herein utilizes the feature of pre-scheduling the communication resource sets to enable resource reuse. The resource reuse is achieved by determining which, if any of the relay nodes are spatially separated for each other, i.e. their coverage areas at least partially overlap, and configuring two or more of these spatially separated relays so that they can use the same communication resources. By using the same communications resources for multiple relay nodes it is possible to reduce the range of required resources in the system.

The receiving resource set and the transmission resource set for each relay node may not comprise overlapping resources. This advantageously prevents self-interference at each relay node.

In a second aspect of the system described herein the method further comprises: calculating the efficiency of a first data transmission path directly communicating between the base station and one of said mobile terminals; calculating the efficiency of a second data transmission path between the base station and the one of said mobile terminals via one or more of said relay nodes; selecting the most efficient data transmission path for use in data transmission between the base station and the one of said mobile terminals.

This aspect of the system described herein provides an additional step of determining whether the mobile terminal should connect the base station directly, or through one or mode relay nodes bay calculating the most efficient path.

In a third aspect of the system described herein one or more mobile terminals is associated with a first relay node, and one or more terminals is associated with a second relay node, at least one of said mobile terminals being associated with both the first relay node and the second relay node, the method further comprising: in the receiving resource set, receiving data scheduled for the at least one of said mobile terminals associated with both the first relay node and the second relay node, at the first relay node and the second relay node in the same resource element; and in the transmission resource set, simultaneously transmitting the received resource element from the first relay node and the second relay node to the at least one of said mobile terminals associated with both the first relay node and the second relay node.

This aspect of the system described herein uses the fact that a mobile device is associated with two (or more) relay nodes as an opportunity for resource reuse and also, advantageously, an opportunity to increase the probability of a successful transmission and a higher modulation order and coding rate. Multiple relay nodes serving a common mobile device are arranged to receive data for the mobile device in the same resource element, rather than receiving the data in separate resource elements. Furthermore, the relay nodes are configured to simultaneously transmit the common data so that interference experienced by the common mobile device is reduced or eliminated.

The simultaneous transmission from the first relay node and the second relay node to the at least one of said mobile terminals associated with both the first relay node and the second relay node may be in the same transmission resource element.

In a forth aspect of the system described herein one or more mobile terminals is associated with a first relay node, and one or more terminals is associated with a second relay node, at least one of said mobile terminals being associated with both the first relay node and the second relay node, the method further comprising: disassociating the first relay node from the at least one of said mobile terminals associated with both the first relay node and the second relay node; in the receiving resource set, receiving data scheduled for the at least one of said mobile terminals at the first relay node and the second relay node in the same resource element; and in the transmission resource set, transmitting the received data from the second relay node to the at least one of said mobile terminals.

In this aspect of the system described herein, rather than allowing multiple relays to communicate with a mobile device, the system selects one relay for communication with the mobile device. This reduces or prevents interference that would otherwise be experienced by the mobile device.

The first relay node may be muted for the duration of the transmission of the transmission resource element to the at least one of said mobile terminals. When the selected relay is communicating with the mobile device using a resource element all other relays in range of the mobile device are muted for that resource element to prevent interference.

At the step of receiving data scheduled for the at least one of said mobile terminals at the first relay node and the second relay node in the third and forth aspects, it is preferable that the nodes simultaneously receive data not scheduled for the at least one of said mobile terminals in a different receiving resource element. By allowing one resource element to be used by multiple relay nodes, the now spare resource elements can be advantageously reused for other data or configuration information.

At least one of the one or more resource elements may be defined in the time domain and/or in the frequency domain.

Where at least one of said mobile terminals being associated with both the first relay node and the second relay node, the mobile terminal is typically located in a region served by both the first relay node and the second relay node.

BRIEF DESCRIPTION OF THE DRAWINGS

Embodiments of the system described herein will now be explained by way of example with reference to the accompanying drawings in which.

DETAILED DESCRIPTION

Figure 1:
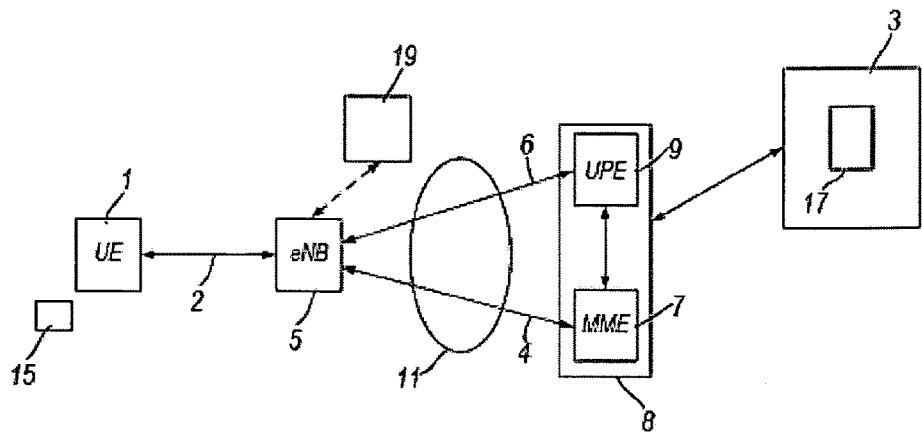
FIG. 1 shows the elements of an SAE/LTE 4G network.

FIG. 1 shows schematically the logical elements of an LTE/SAE mobile telecommunications network. Mobile terminal (UE) 1 is registered with mobile telecommunications network core 3. The mobile terminal 1 may be any device with mobile communication capabilities, including a handheld mobile telephone, a personal digital assistant (PDA) a laptop or desktop personal computer—for example, equipped with a wireless datacard. Although only one mobile terminal 1 is shown in FIG. 1, there will in practice be a multiplicity of mobile terminals, each of which is registered with the network core 3.

The terminal 1 communicates wirelessly with the mobile telecommunications network core 3 via the radio access network (RAN) of the mobile telecommunications network core 3 over radio interface 2. The RAN comprises a plurality of eNodeBs (eNB) 5. Each eNodeB 5 performs functions generally similar to those performed by the NodeB and the radio network controller (RNC) of a 3G network. Each eNodeBs 5 serves a particular area or "cell". Each eNode B is coupled to an antenna device. The eNode B and antenna device form a cell site. The cell site provides radio coverage to a plurality of cells, e.g. three. Typically, the cell site will only provide radio coverage for a portion of each of the cells. Other portions of each of the cells are provided with radio coverage and by other cell sites.

Signalling in a mobile telecommunications network can be considered to be separated into user plane signalling and control plane signalling. The control plane performs the required control signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted. A Packet Data Network Gateway (PDN-GW) terminates the user plane within the core 3.

A mobility management entity (MME) 7 provides equivalent functions to the control plane functions of the SGSN and GGSN from the 3G architecture (3GPP Release-6). The MME handles security key management. The MME also provides control plane function for mobility between LTE and GSM/UMTS networks. Communications between the eNodeB 5 are transmitted to the MME 7 via the S1-c Interface 4.

A user plane entity (UPE) 9 handles the user plane traffic functions from the terminal 1 which includes the IP header and payload compression and ciphering. This UPE 9 provides the equivalent functions to the user plane part of the 3G RNC and the user plane part of the 3G GGSN. Communications between the eNodeB 5 are transmitted to the UPE 7 via the S1-u Interface 6.

It should be noted that, although in FIG. 1 the MME 7 and UPE 9 are shown as separate logical entities they may exist as a single physical node of the telecommunications network, i.e. as a single gateway (GW) 8. Data are transmitted between the eNodeB 5 and the MME 7 and UPE 9 via IP transport network 11.

Figure 2:
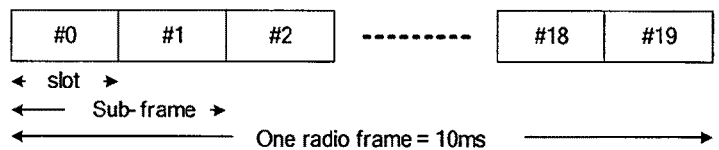
FIG. 2 shows a Type 1 frame structure applicable to FDD.

E-UTRAN is the air interface for LTE/SAE which uses Orthogonal Frequency Division Multiple Access (OFDMA) in the downlink (eNB to terminal) and Single Carrier Frequency Division Multiple Access (SC-FDMA) in the uplink, with the downlink and uplink transmissions organized into radio frames with 10 ms duration. In LTE, two radio frame structures are supported, being Type 1, which is applicable to FDD and Type 2 applicable to TDD. For frame structure Type 1, which is illustrated in FIG. 2, each 10 ms radio frame is divided into ten equally sized sub-frames. Each sub-frame consists of two equally sized slots. For FDD, 10 sub-frames are available for downlink transmission and 10 sub-frames are available for uplink transmissions in each 10 ms interval. Uplink and downlink transmissions are separated in the frequency domain.

Figure 3:
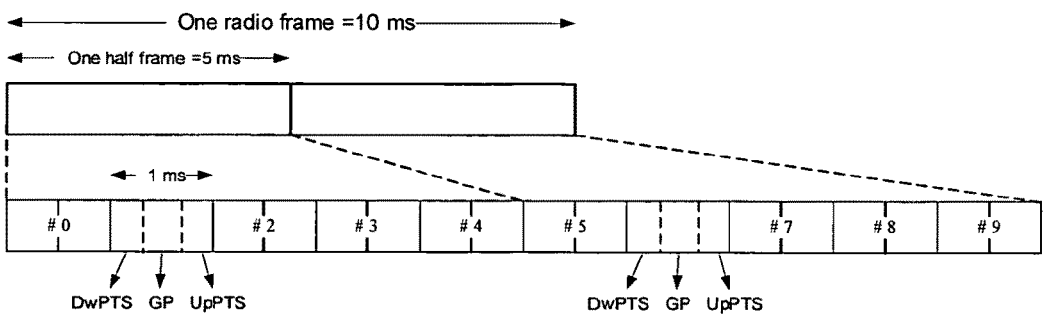
FIG. 3 illustrates a Type 2 frame structure applicable to TDD.

For frame structure Type 2, as illustrated in FIG. 3, each 10 ms radio frame consists of two half-frames of 5 ms each. Each half-frame consists of eight slots of length 0.5 ms and three special fields: DwPTS (Downlink Pilot Time Slot), GP (Guard Period) and UpPTS (Uplink Pilot Time Slot). The length of DwPTS and UpPTS is configurable subject to the total length of DwPTS, GP and UpPTS being equal to 1 ms. All other sub-frames consist of two equally sized slots. Uplink and downlink transmissions are separated in the time domain. These frame structures are applicable to frequency division duplex (FDD)—the use of frequency-division multiplexing to separate outward and return signals—and time division duplex (TDD)—the use of time-division multiplexing to separate outward and return signals.

As mentioned above, data are transmitted in the downlink (DL) by OFDMA. According to OFDMA the available frequency spectrum is divided into several sub-carriers where the resources are partitioned in a time-frequency space, and slots are assigned along an OFDM symbol index and OFDM sub-carrier index. The size of the sub-channels is usually chosen such that it is within the coherence bandwidth. To maximise spectral efficiency, the frequency responses of the sub-carriers are overlapping and orthogonal. The OFDMA are organised into frames of 10 ms duration.

Transparent Relay Related Concepts

Figure 4:
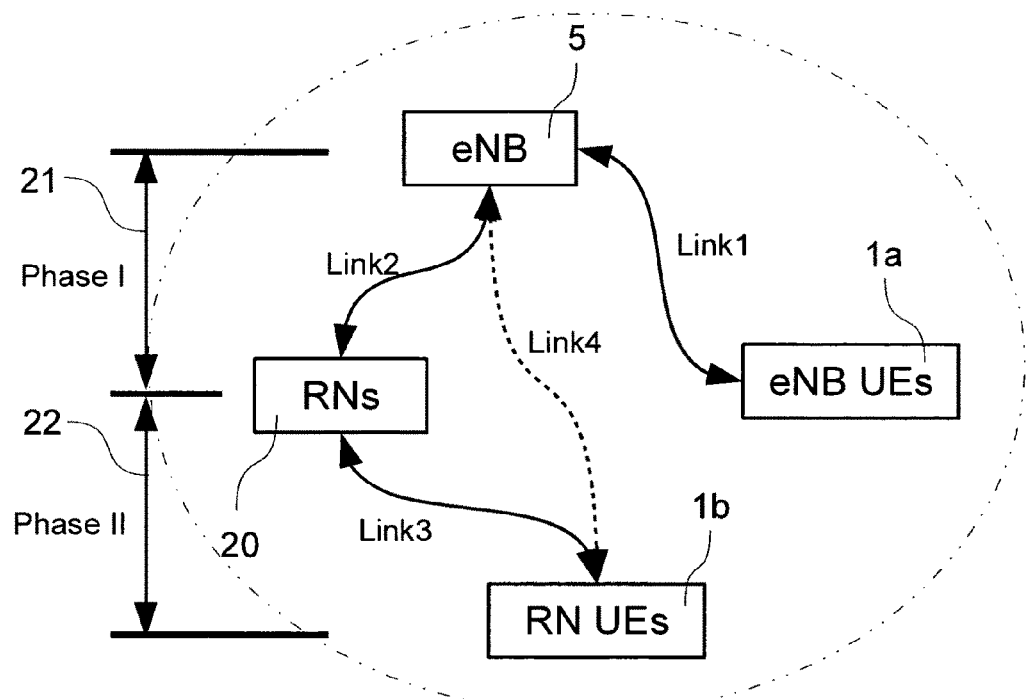
FIG. 4 shows schematically the logical elements of an eNB cell with Type II relays.

FIG. 4 shows schematically the logical elements of an eNB cell with Type II relays comprising an eNB 5, one or more RNs 20 associated with the eNB 5, also known as a donor eNB (DeNB), and one or more UEs 1a, 1b that are associated either with one or more RNs 20 (known as an RN UE) or directly with eNB 5 (known as an eNB UE).

FIG. 4 shows four types of data links in an eNB cell with Type II relays:
 1) Link1 between eNB and eNB UEs;
 2) Link2 between eNB and RNs;
 3) Link3 between RNs and RN UEs; and
 4) Link4 between eNB and RN UEs.

The Two-Phase Process of Relay

A Type II relay follows a two-phase process. Taking Down Link (DL) as example, the first phase 21 is known as the RN receiving phase in which the eNB 5 delivers data to RN 20; and the second phase 22 is known as the RN transmitting phase 22 in which the RN 20 delivers data to RN UE 1a. Note that in the RN receiving phase 21, the RN 20 should be ensured to correctly receive and decode the data over Link2, and the UE in this phase may also receive data via Link4, i.e. directly from eNB 5. In the RN transmitting phase 22, the task of RN 20 is to transmit data in the synchronous resources and to boost data transmission to RN UE 1a. There are two options regarding the cooperation among RNs 20 and eNB 5 in transmission:
 1) eNB-RN cooperating mode: In the case of eNB-RN cooperating mode, information over Link4 should be a concurrent transmission with Link3;
 2) RN solo mode: Alternatively Link4 is intentionally muted on DL data channel (PDSCH in LTE) and only provides physical control information (PDCCH in LTE) to instruct RN UE 1a for correct reception of the pre-scheduled data from RN(s) 20. In this case it is possible to allow RN-RN joint transmission or coordinated muting for example when a UE 1b perceives strong coverage from more than one RN 20.

In the case of uplink (UL) a similar 2-phase process is followed so will not be explicitly described further.

Resource Efficiency and UE Association to RN

The resource allocations among Link1, Link2 and Link3 can be made orthogonal in the 3-dimension resource space measured by time, frequency and space. The link3 logically represent the access of a UE 1a to a RN 20.

Since RN 20 is typically a low power node e.g. 30 dBm or less, and therefore virtually forms a Pico cell. This means that the geographical coverage overlap among RN 20 cells can be trivial, which thus allow concurrent transmission among RN 20 cells using the same resource while the cross-cell interference that the UE 1a perceives is low enough. Such spatial isolation allows resource reuse among RN cells, which will bring large performance gain. The following performance analysis apply:
 Information bits respectively provided via Link2 and Link3 should be equal over a time period that is long enough, as the two links are concatenated. The resources can be measured in time-frequency domain in the case of LTE the number of resource blocks. Efficiency can be measured by information bits per unit resource, i.e. bit/Hz/second.
 Given the above condition, the resource efficiency serving a UE will be $E_1$ via Link1 as an eNB UE, and $E_r$ via Link2+Link3 as a RN UE.
 The efficiency $E_r$ via Relay over concatenated Link2 and Link3 is:

$$\frac{E_3 E_2}{E_3 + E_2}$$

In case of resource reuse over Link3 the $E_r$ will be:

$$\frac{E_2}{1 + E_2/nE_3}$$

Where $E_1$, $E_2$, and $E_3$ are the resource efficiencies via Link1, Link2, and Link3 respectively.

Therefore it can be seen that the link efficiency via relays increases when number of relays supporting resource reuse increases.

For a UE 1 in a macro cell with multiple RNs 20, a link should be chosen for a UE 1 so that the UE 1 shall be served with better efficiency. i.e. the UE 1 should be served via a RN 20 if $E_r$ is measured higher than $E_1$, otherwise the UE 1 should be served directly by the DeNB via link1.

Resource Reuse Via Pre-Scheduling

The synchronous HARQ (Hybrid ARQ) scheme described in the above-mentioned reference proposed a pre-scheduling mechanism, where HARQ process is scheduled in a set of sub-frames with fixed pattern in time-frequency domain. In this configuration RN will receive the data in the early phase of a HARQ transmission, and then join in HARQ retransmission in the later phase.

The Link3 (the link between RNs and UEs) of different RNs is treated as spatially separated when the interference cross RN cells is trivial. To enjoy the resource reuse gain, it is preferred in this case that resources over Link3 should be reused among RNs which are spatially separated. This will bring performance gain as if in the case of frequency-reuse-one cell split, and at the same time maintain resource orthogonality with donor macro cell and therefore avoiding DeNB-RN cross interference that is typically the major interference considered.

Resource reuse is implemented by synchronous pre-scheduling. As described in the above-mentioned reference, two sets of resources e.g. LTE sub-frames are predefined, so that RN can receive data from the one predefined set of resources and conduct retransmission in another predefined set of resources. To realize resource reuse, different RN should be scheduled with the same set of resources for retransmissions for those RN UEs that are measured strong coverage by a major RN while interferences from other RN cells is relatively weak. As a preferred case, resource reuse is suitable among RNs that are spatially separated.

The data receptions at the UE during the whole HARQ course should be instructed by physical layer control signalling (PDCCH in LTE) from DeNB. The corresponding DeNB access transmission (SCH in LTE) for eNB UE should be muted in this case to avoid interference from the donor cell to RN transmission.

Figure 5:
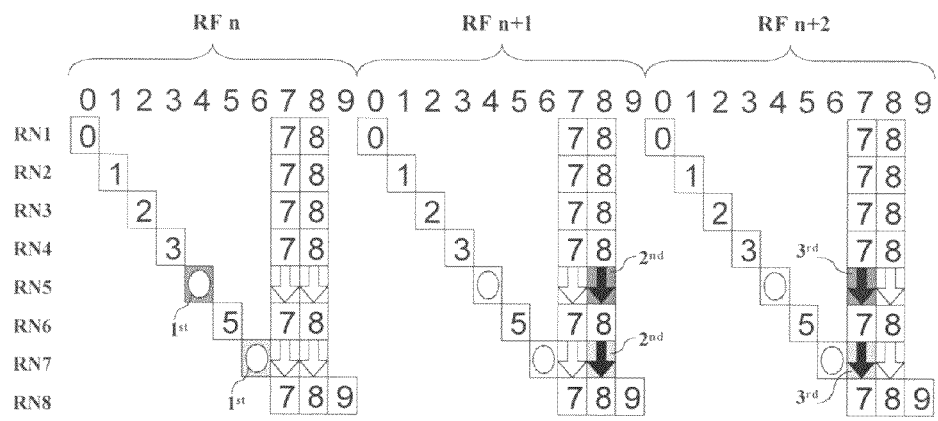
FIG. 5 is an illustrative example of time division multiplexing resource allocation in RN receiving phase for eight relay nodes.

In the RN receiving phase, the resource allocation among RN can be TDM (Time Division Multiplexing) or FDM (Frequency Division Multiplexing). FIG. 5 gives an example in TDM where data for each RN to receive are scheduled in a particular sub-frame.

FIG. 5 is an illustrative example of time division multiplexing resource allocation in RN receiving phase for eight relay nodes (RN1-RN8), and showing three radio frames (RF) n, n+1, and n+2, each consisting of ten sub-frames numbered 0 to 9. Each RN is configured to receive (receiving phase) in sub-frames 0-6 and 9, and transmit (transmission phase) in sub-frames 7 and 8. For the ease of DeNB to schedule in this example each RN will only be scheduled data in a single sub-frame. RN5 and RN7 are spatially separated from each other In this illustrative example, for RN5 the RN receiving occurs in sub-frame #4 of radio frame n, and for RN7 the RN receiving occurs in sub-frame 6 of radio frame n. For both RN5 and RN7, RN transmitting occurs in sub-frame 8 of radio frame n+1 and sub-frame 7 of radio frame n+2 thereby implementing resource reuse. This transmission pattern may continue in subsequent radio frames.

Figure 6:
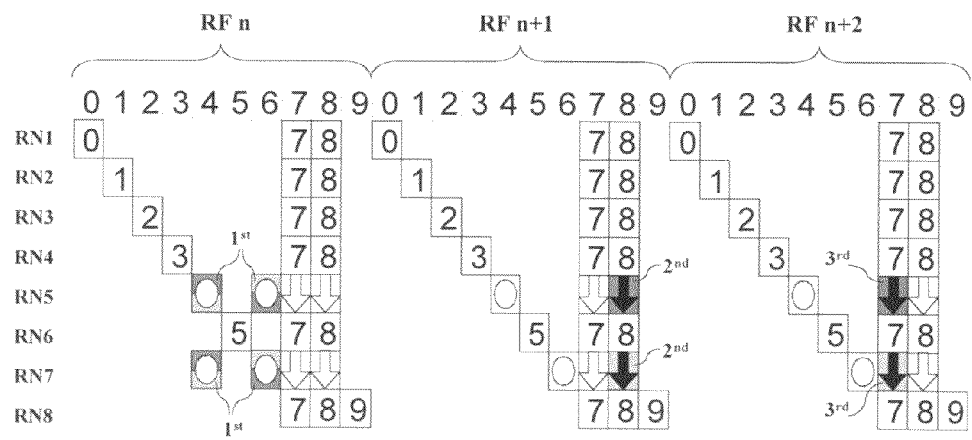
FIG. 6 is an illustrative example of frequency division multiplexing resource allocation in RN receiving phase for eight relay nodes.

FIG. 6 has a similar configuration to FIG. 5 but is an example using FDM. FIG. 6 shows that data for RN5 and RN7 can share the same sub-frame but at a different frequency resources. In this example RN5 and RN7 both receive data in sub-frame 4 and sub-frame 6, and RN transmitting occurs in sub-frame 8 of radio frame n+1 and sub-frame 7 of radio frame n+2 thereby implementing resource reuse.

When using TDM the number of RNs is limited by the number of sub-frames available in each radio frame since each RN needs its own sub-frame in the RN receiving phase. FDM resource allocation in RN receiving phase allows the possibility of having more RNs than the number of sub-frames available for TDM, for example when 10 RNs are supported in a DeNB cell then FDM become necessary.

To give maximum flexibility for the RN to receive data, each RN should listen to every sub-frame during RN receiving phase, which in FIGS. 4 and 5 are sub-frames 0-6 and 9, to detect and receive any data transmission to UEs in the RN's coverage. This is illustrated in FIG. 7.

Figure 7:
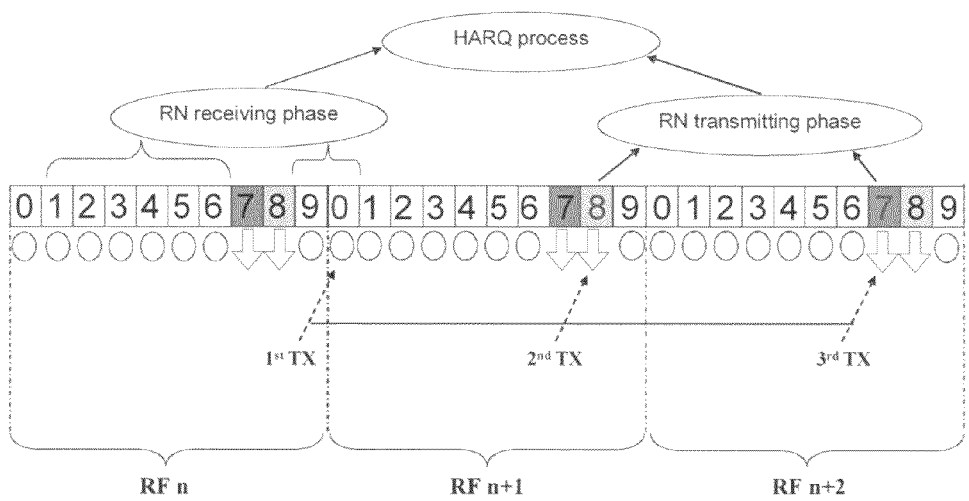
FIG. 7 illustrates the distribution of the communications resources in three consecutive radio frames.

FIG. 7 illustrates three consecutive radio frames n, n+1, n+2, each having ten sub-frames 0-9. Each RN monitors sub frames 0-6 and 9 during the RN receiving phase, and RN transmitting occurs simultaneously among RNs in sub-frames 7 and 8. It is illustrated that a HARQ process has two phases: RN receiving phase and RN transmitting phase. In the exemplary HARQ process the first transmission occurs in sub-frame 0 of a radio frame n+1, the second transmission occurs in sub-frame 8 of the same radio frame, and the third transmission occurs at the sub-frame 7 of radio frame n+2.

Resource Partitioning for Resource-Reuse Scheduling

In this example shown in FIG. 7, each RN has a series of sub-frames in which HARQ can occur, i.e. the second transmission occurs in sub-frame 8 in radio frame n+1 and the third transmission occurs in sub-frame 7 in radio frame n+2, whilst the first transmission can be anywhere in sub-frame 1-6 or 9 in radio frame n or in sub-frame 0 in radio frame n+1. Such pattern continues in subsequent radio frames. Due to this property, the resources assigned to a specific RN during the RN receiving phase (in this example sub-frames 1-6 or 9 in radio frame n and sub-frame 0 in radio frame n+1) shall not overlap in frequency domain across sub-frames, that is, If during a RN receiving phase a resource block indexed i (that uniquely identifies a resource block in a sub-frame) is allocated in a sub-frame for a RN, in any later sub-frame during the same RN receiving phase (in this example until sub-frame 0 in RF n+1) the resource block with the same index i shall not be scheduled data for the same RN.

In other words, a RN can only get resource block indexed i at most once during a RN receiving phase.

Figure 8:
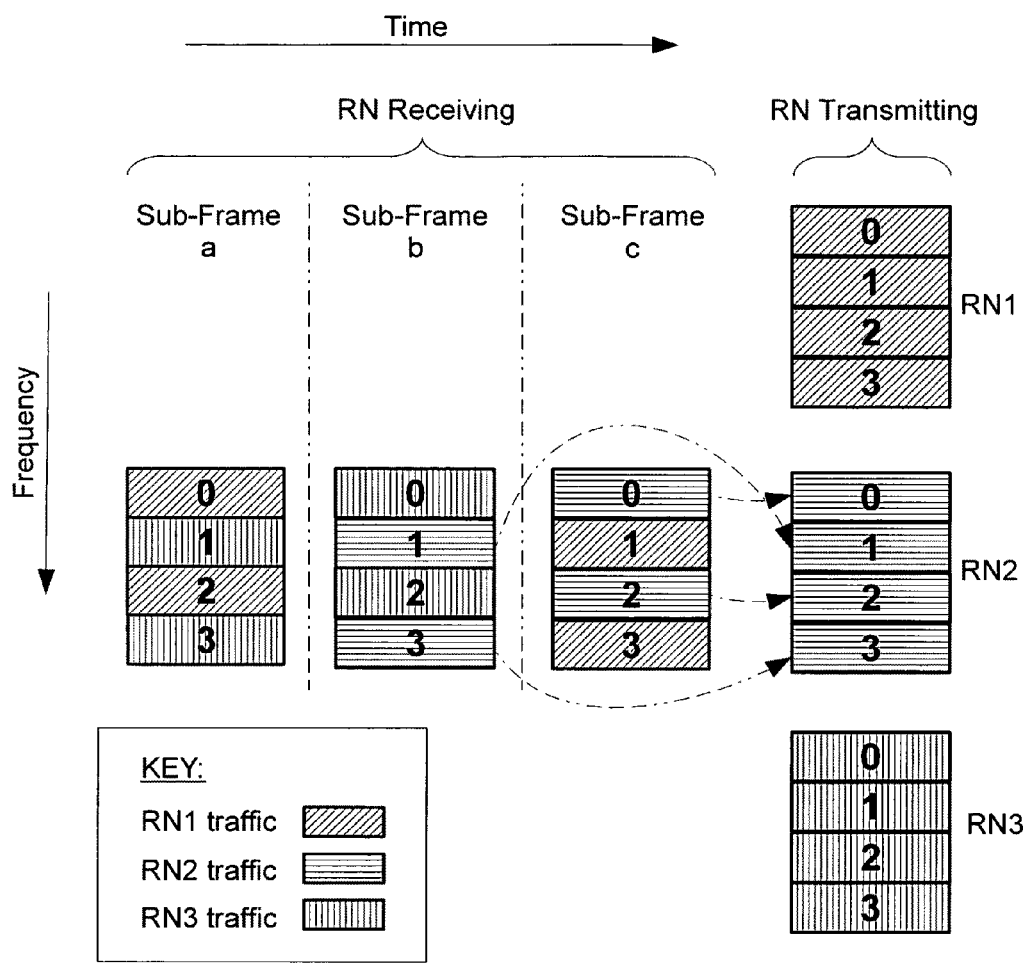
FIG. 8 shows schematically three RNs sharing three RN receiving sub-frames and one RN transmitting sub-frame.

For any given N RN receiving sub-frames if there are M RNs hosted by a donor eNB, each of the RN Receiving SF (R-R-SF) can accordingly be partitioned statically (or semi-statically) into K portions orthogonal in frequency domain. Each potion indexes a number i=0, 1 . . . K−1 in a RN receiving sub-frame, and all R-R-SFs follow the same resource partition pattern in terms that the same resource portion in the frequency domain indexed the same number i. With such resource partition, for each RN the donor eNB can form a set of virtual RN receiving resources across these SFs by taking any number of resource portions of different index numbers from the total MK portions in RN receiving resource pool. FIG. 8 gives an example of scheduling based on such resource partition method.

FIG. 8 shows schematically three RNs sharing three RN receiving sub-frames a, b, and c (which correspond to any one of sub-frames 1-6 and 9 of the previous examples) and one RN transmitting sub-frame d (which corresponds to either sub-frame 7 or 8 of the previous examples). Each RN receiving sub-frame is partitioned into four portions in the frequency domain RN UE Groups and RN-RN Coordinated Transmission In FIG. 8 RN1, RN2 and RN3 are spatially separate from one another so there is no, or trivial cross RN interference between RNs. However, in a DeNB cell with multiple relay nodes, some RNs could be overlapping in coverage, which means resource reuse may cause non-trivial cross RN-cell interference. In such cases coordination like RN-RN joint transmission or only to allow one RN to transmit while muting the interfering RN at that resource would be preferred. To further optimize for a balance between interference coordination and resource reuse, the following UE grouping method is proposed based on which RN-RN coordination and RN-RN resource reuse can be realized by informing each RN the UE group it should process for relay operation.

The HARQ transmission for a UE can be relayed by one or more than one RN(s). RN UE group can be defined as one or more UEs which are served by a common RN or group of RNs. From RN point of view, all UEs that are relayed by this RN construct a RN UE group for this RN, called RUG. From UE point of view, a UE can have multiple associated RNs, and in this case RN-RN coordination is preferred. All the associated RNs form the RN Set for that UE. RN UE can therefore be grouped so that each of UE in such group associates with the same RN Set. We call such RN UE set elementary RN UE group (ERUG). Each RN has at most one RUG. A RUG consists of one or more ERUGs. One simple form of ERUG can be that each ERUG is associated to only one RN. Therefore each ERUG represents a RUG, which corresponds to the case that RNs are spatially separated or UE in each ERUG perceives no cross-RN interference. In this case resource reuse should be activated among RNs to boost for more efficient resource utilization.

Once RUG is informed to a RN, the RN shall monitor and relay traffics targeted for any UE belonging to this RUG.

Figure 9:
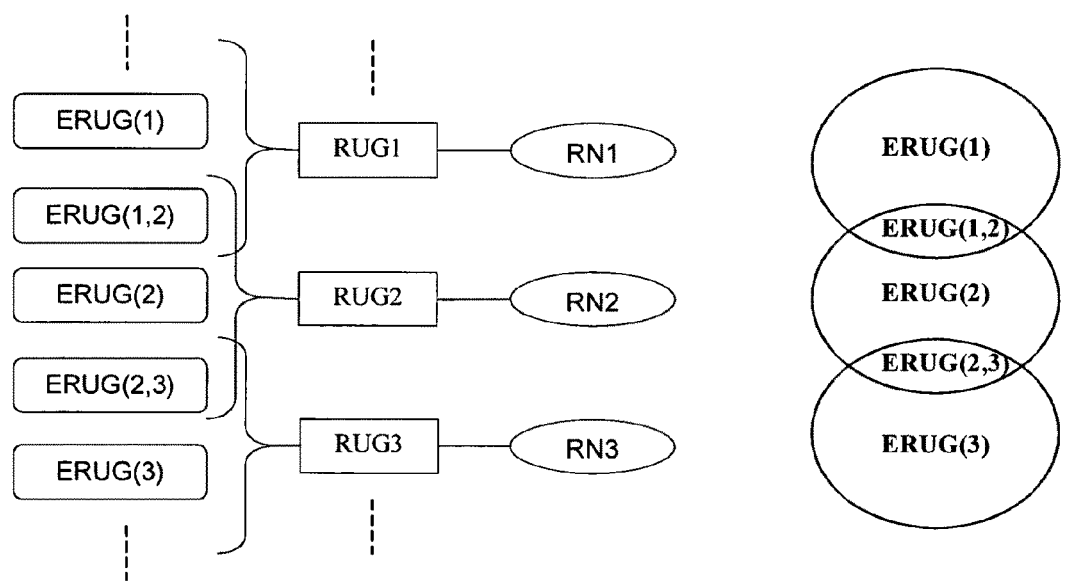
FIG. 9 FIG. 9 schematically shows three RN nodes where RN2 partially overlap both RN1 and RN3.

Understanding of the above is aided by referring to FIG. 9. FIG. 9 schematically shows three RN nodes where RN2 partially overlap both RN1 and RN3. Therefore, RUG1 consists of ERUG(1) and ERUG(1,2); RUG2 consists of ERUG(2), ERUG(1,2) and ERUG(2,3); RUG3 consists of ERUG(2,3) and ERUG(3).

In the case that UEs exist in overlapped coverage of more than one RNs, the corresponding ERUG, being ERUG(1,2) and ERUG(2,3) in FIG. 9, should be considered for RN-RN coordination of either RN-RN joint transmission or RN-RN coordinated muting, which can be realized by proper RN UE group configuration decided at DeNB and subsequently signalled to the RNs.

In the case of joint transmission, each RN in cooperation will be informed of the corresponding RN UE group (RUG). The RUGs for RNs in coordination consist of common ERUG that represents the common UEs which are present in the overlapped coverage area. The traffic to a particular common UE will be put in RN receiving resources so that each RN in cooperation can receive it during the RN receiving phase (because this UE presents in the each RN RUG in coordination, so each RN will activate relay operation upon the detection of traffic targeted for such UE), and at RN transmitting phase each of the RN will have synchronized retransmission for the UE traffic.

In the case of coordinated muting, the DeNB should configure the UE group to a major RN (or a major set of RNs) which will transmit during the RN transmitting phase, while not configuring the same UE group to any other RNs in the coordination. Additionally if any resource indexed i is scheduled for a coordinated muting traffic, any resource with the same index i during the same RN receiving phase shall not be scheduled to any coordinated RN that are configured to be muted in RN transmission phase.

Figure 10:
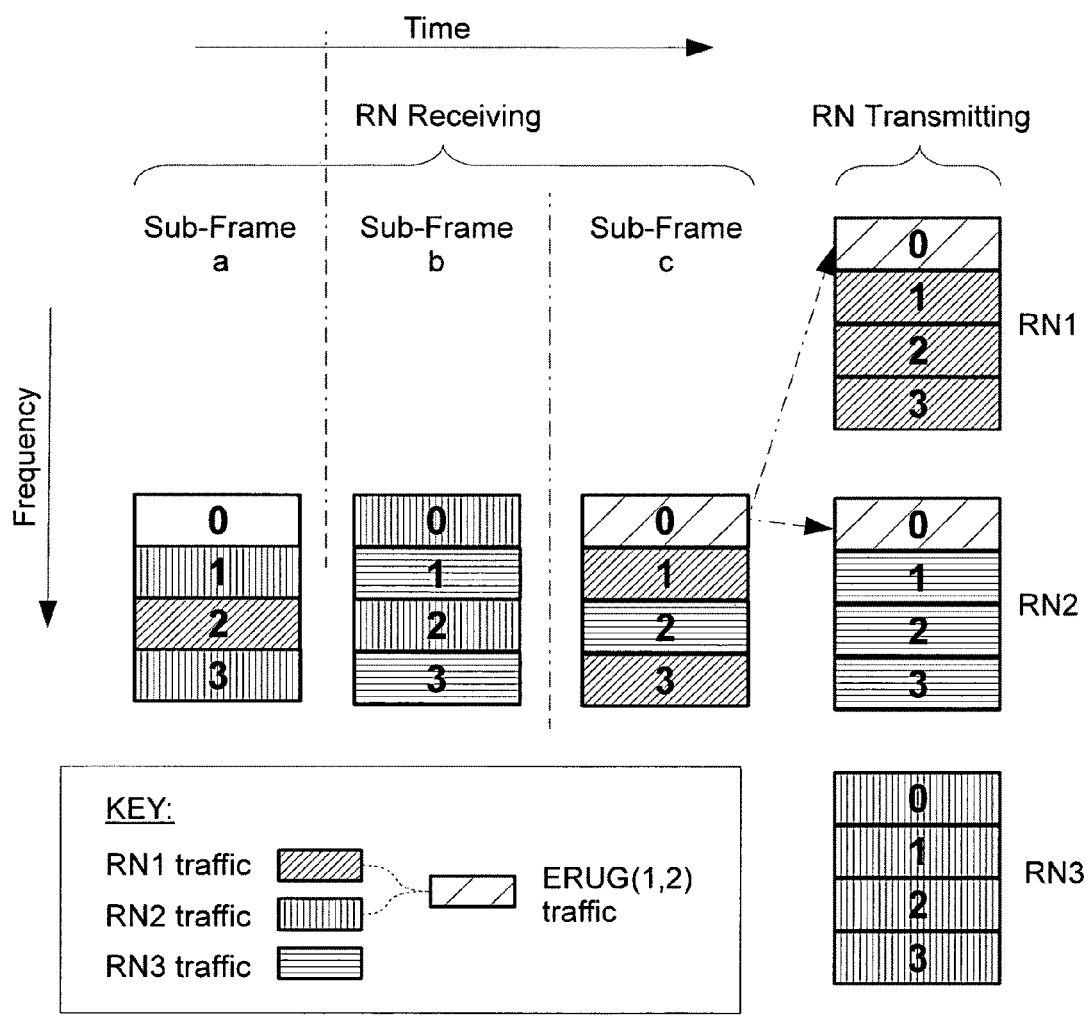
FIG. 10 illustrates the arrangement of the resource elements according to the third aspect of the system described herein.
Figure 11:
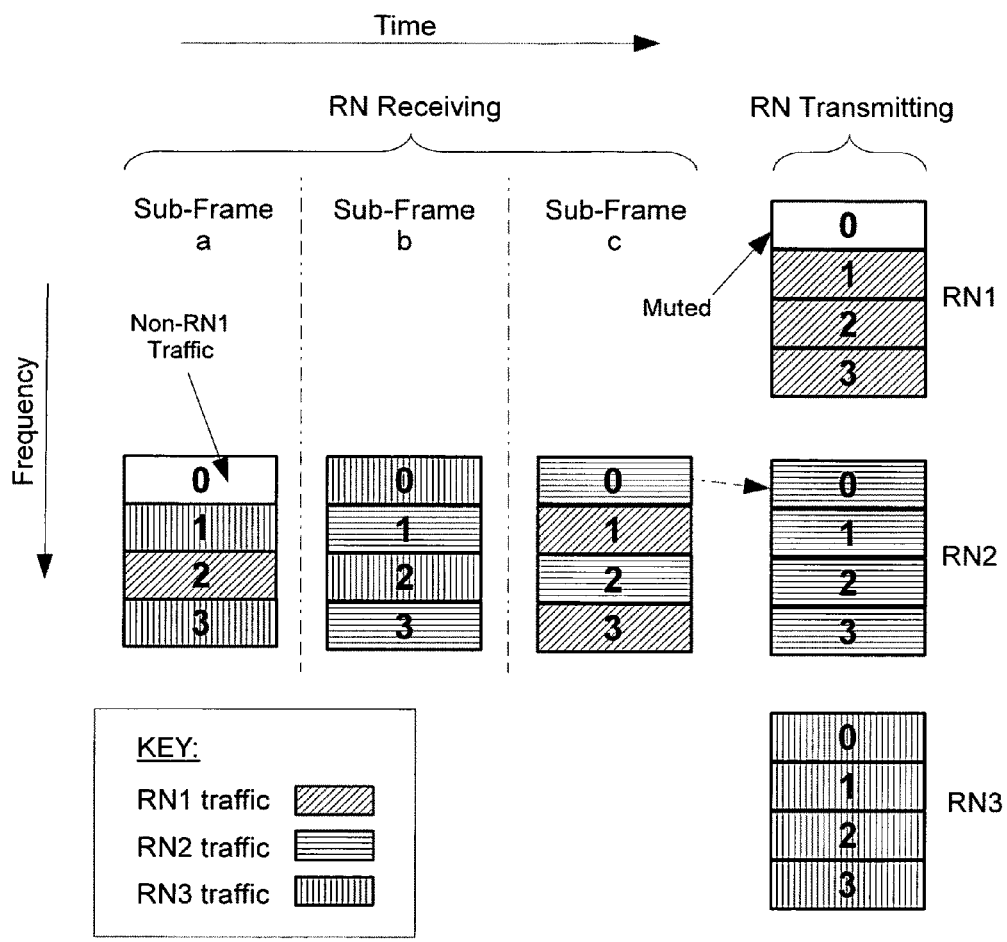
FIG. 11 illustrates the arrangement of the resource elements according to the forth aspect of the system described herein.

FIG. 10 and FIG. 11 show two coordination scenarios suitable when RN1 and RN2 have overlapped coverage, and where ERUG(1,2) is not empty, i.e. there is at least one UE in the overlapping area between RN1 and RN2.

In FIG. 10, the UE group RUG1 is associated with RN1 and the UE group RUG2 is associated with RN2. Both RN UE groups contain the common Elementary RN UE Group ERUG(1,2). When traffic scheduled in RN Receiving phase for at least one UE in ERUG(1,2), which in this example is resource indexed 0 at sub-frame c, both RN1 and RN2 will receive the data. At the RN transmitting phase, both RNs transmit the data simultaneously realizing joint transmission. Since both RN1 and RN2 are transmitting the same data to ERUG(1,2) then not only is the interference reduced or eliminated, but also the receiving power is boosted by the joint transmission, thereby increasing the probability of a successful transmission and should allow higher modulation order and coding rate.

In FIG. 11, the UE group RUG1 is associated with RN1; the UE group RUG2 is associated with RN2. Transmissions form RN1 are causing interference at one or more UE(s) in RUG2. To successfully implement coordinated muting in this scenario, the interfered UE(s) in ERUG(1,2) should not be put into RUG1, therefore when such UEs in RUG2 is served, the neighbouring RN1 is intentionally to be muted. As shown in FIG. 11, there is traffic for the interfered UE(s) scheduled at resource indexed 0 in sub-frame c in the RN Receiving phase. RN2 will receive the data as RN2 has the UE in its RUG2. At RN transmitting phase, RN2 transmits the data while RN1 is muted as there is no traffic targeted for RN1 at resource indexed 0 during the RN receiving phase. Since only RN2 is transmitting data to ERUG(1,2) there is no non-trivial interference from RN1.

The scheduling schemes herein described further enhanced the pre-scheduling techniques introduced in the above-referenced document to allow resource reuse among RNs hosted by a DeNB, and to allow RN-RN coordination that can be either RN-RN joint transmission or RN-RN coordinated muting.

The synchronous HARQ resources defined for relay traffic put no restrictions on non-relay-UE traffic, that is, a non-relay-UE has freedom to follow any HARQ resource pattern and can be fully adaptive. Therefore the synchronous HARQ resources targeted for RN UE when not used can always be used for a non-relay-UE, therefore resulting in no over-booking for relay traffic.

The scheduling schemes introduced herein are applicable for relay system in both uplink traffic and downlink traffic. The technology described herein is suitable and at least applicable to OFDM based communication system such as LTE and WiMax.

The embodiments of the system described herein are to be taken as illustrative of the invention, and not limitative. For instance, the embodiments have been described with particular application to LTE Rel-8 and/or LTE Advanced, and particularly in regard to their usage of transparent L2 relays employing coherent transmission and synchronous HARQ transmissions. However the embodiments may equally be applied to any network configured to utilise relay nodes and/or HARQ such as that described in IEEE 802.16m (Wi-MAX Advanced Air Interface).

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, and/or a combination of software and hardware. Software implementations of the system described herein may include executable code that is stored in a computer readable storage medium and executed by one or more processors.

The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. In a telecommunications network including a plurality of mobile terminals in communication with a network base station, and a plurality of relay nodes configured to assist the base station with data transmissions between the base station and one or more of said plurality of mobile terminals, a method of enabling communication resource reuse amongst the plurality of said relay nodes, the method comprising:
   defining a plurality of communication resource sets each resource set comprising one or more communication resource elements, the communication resource sets arranged so that each relay node can receive data in a receiving resource set and transmit data in a transmission resource set;
   determining which of two or more relay nodes are spatially separated from one another;
   configuring at least two of the two or more spatially separated relay nodes to use the same communication resource sets;
   calculating the efficiency of a first data transmission path directly communicating between the base station and one of said mobile terminals;
   calculating the efficiency of a second data transmission path between the base station and the one of said mobile terminals via one or more of said relay nodes;
   selecting the most efficient data transmission path for use in data transmission between the base station and the one of said mobile terminals.

2. The method of claim 1, wherein the receiving resource set and the transmission resource set for each relay node do not comprise overlapping resources.

3. The method of claim 1, wherein at least one of the one or more resource elements are defined in the time domain.

4. The method of claim 1, wherein at least one of the one or more resource elements are defined in the frequency domain.

5. In a telecommunications network including a plurality of mobile terminals in communication with a network base station, and a plurality of relay nodes configured to assist the base station with data transmissions between the base station and one or more of said plurality of mobile terminals, a method of enabling communication resource reuse amongst the plurality of said relay nodes, the method comprising:
   defining a plurality of communication resource sets each resource set comprising one or more communication resource elements, the communication resource sets arranged so that each relay node can receive data in a receiving resource set and transmit data in a transmission resource set;
   determining which of two or more relay nodes are spatially separated from one another;
   configuring at least two of the two or more spatially separated relay nodes to use the same communication resource sets, wherein one or more mobile terminals is associated with a first relay node, and one or more terminals is associated with a second relay node, at least one of said mobile terminals being associated with both the first relay node and the second relay node;
   in the receiving resource set, receiving data scheduled for the at least one of said mobile terminals associated with both the first relay node and the second relay node, at the first relay node and the second relay node in the same resource element; and
   in the transmission resource set, simultaneously transmitting the received resource element from the first relay node and the second relay node to the at least one of said mobile terminals associated with both the first relay node and the second relay node.

6. The method of claim 5, wherein the simultaneous transmission from the first relay node and the second relay node to the at least one of said mobile terminals associated with both the first relay node and the second relay node is in the same transmission resource element.

7. The method of claim 5, wherein at the step of receiving data scheduled for the at least one of said mobile terminals at the first relay node and the second relay node, simultaneously receiving data not scheduled for the at least one of said mobile terminals in a different receiving resource element.

8. The method of claim 5, wherein at least one of said mobile terminals being associated with both the first relay node and the second relay node is located in a region served by both the first relay node and the second relay node.

9. In a telecommunications network including a plurality of mobile terminals in communication with a network base station, and a plurality of relay nodes configured to assist the base station with data transmissions between the base station and one or more of said plurality of mobile terminals, a method of enabling communication resource reuse amongst the plurality of said relay nodes, the method comprising:
   defining a plurality of communication resource sets, each resource set comprising one or more communication resource elements, the communication resource sets arranged so that each relay node can receive data in a receiving resource set and transmit data in a transmission resource set;
   determining which of two or more relay nodes are spatially separated from one another;
   configuring at least two of the two or more spatially separated relay nodes to use the same communication resource sets, wherein one or more mobile terminals is associated with a first relay node, and one or more mobile terminals is associated with a second relay node, at least one of said mobile terminals being associated with both the first relay node and the second relay node;
   disassociating the first relay node from the at least one of said mobile terminals associated with both the first relay node and the second relay node;
   in the receiving resource set, receiving data scheduled for the at least one of said mobile terminals at the first relay node and the second relay node in the same resource element; and
   in the transmission resource set, transmitting the received data from the second relay node to the at least one of said mobile terminals.

10. The method of claim 9, wherein the first relay node is muted for the duration of the transmission of the transmission resource element to the at least one of said mobile terminals.

11. A radio access subsystem comprising a network base station, and a plurality of relay nodes configured to assist the base station with data transmissions between the base station and one or more of a plurality of mobile terminals, the subsystem being arranged to:
define a plurality of communication resource sets each resource set comprising one or more communication resource elements, the communication resource sets arranged so that each relay node can receive data in a receiving resource set and transmit data in a transmission resource set;
determine which of two or more relay nodes are spatially separated from one another; and
configure at least two of the two or more spatially separated relay nodes to use the same communication resource sets,
the subsystem further comprising:
a first calculating device that calculates the efficiency of a first data transmission path directly communicating between the base station and one of said mobile terminals;
a second calculating device that calculates the efficiency of a second data transmission path between the base station and the one of said mobile terminals via one or more of said relay nodes; and
a selecting device that selects the most efficient data transmission path for use in data transmission between the base station and the one of said mobile terminals.

12. A radio access subsystem comprising a network base station, and a plurality of relay nodes configured to assist the base station with data transmissions between the base station and one or more of a plurality of mobile terminals, the subsystem being arranged to:
define a plurality of communication resource sets each resource set comprising one or more communication resource elements, the communication resource sets arranged so that each relay node can receive data in a receiving resource set and transmit data in a transmission resource set;
determine which of two or more relay nodes are spatially separated from one another; and
configure at least two of the two or more spatially separated relay nodes to use the same communication resource sets, wherein one or more mobile terminals is associated with a first relay node, and one or more mobile terminals is associated with a second relay node, at least one of said mobile terminals being associated with both the first relay node and the second relay node, the subsystem further comprising:
in the receiving resource set, a receiver that receives data scheduled for the at least one of said mobile terminals associated with both the first relay node and the second relay node, at the first relay node and the second relay node in the same resource element; and
in the transmission resource set, a transmitter that simultaneously transmits the received resource element from the first relay node and the second relay node to the at least one of said mobile terminals associated with both the first relay node and the second relay node.

13. A radio access subsystem comprising a network base station, and a plurality of relay nodes configured to assist the base station with data transmissions between the base station and one or more of a plurality of mobile terminals, the subsystem being arranged to:
define a plurality of communication resource sets each resource set comprising one or more communication resource elements, the communication resource sets arranged so that each relay node can receive data in a receiving resource set and transmit data in a transmission resource set;
determine which of two or more relay nodes are spatially separated from one another; and
configure at least two of the two or more spatially separated relay nodes to use the same communication resource sets, wherein one or more mobile terminals is associated with a first relay node, and one or more terminals is associated with a second relay node, at least one of said mobile terminals being associated with both the first relay node and the second relay node,
the subsystem further comprising:
a disassociating device that disassociates the first relay node from the at least one of said mobile terminals associated with both the first relay node and the second relay node;
in the receiving resource set, a receiver that receives data scheduled for the at least one of said mobile terminals at the first relay node and the second relay node in the same resource element; and
in the transmission resource set, a transmitter that transmits the received data from the second relay node to the at least one of said mobile terminals.

14. A non-transitory computer readable storage medium storing computer software that enables communication resource reuse among a plurality of relay nodes, the computer software comprising:
executable code that defines a plurality of communication resource sets, each resource set comprising one or more communication resource elements, the communication resource sets arranged so that each relay node receives data in a receiving resource set and transmits data in a transmission resource set;
executable code that determines which of two or more relay nodes are spatially separated from one another;
executable code that configures at least two of the two or more spatially separated relay nodes to use the same communication resource sets;
executable code that calculates the efficiency of a first data transmission path directly communicating between the base station and one of said mobile terminals;
executable code that calculates the efficiency of a second data transmission path between the base station and the one of said mobile terminals via one or more of said relay nodes; and
executable code that selects the most efficient data transmission path for use in data transmission between the base station and the one of said mobile terminals.

15. The non-transitory computer readable storage medium of claim 14, wherein the plurality of relay nodes assist a base station with data transmissions between the base station and one or more of a plurality of mobile terminals.

16. A non-transitory computer readable storage medium storing computer software that enables communication resource reuse among a plurality of relay nodes, the computer software comprising:
executable code that defines a plurality of communication resource sets, each resource set comprising one or more communication resource elements, the communication resource sets arranged so that each relay node receives data in a receiving resource set and transmits data in a transmission resource set;

executable code that determines which of two or more relay nodes are spatially separated from one another;

executable code that configures at least two of the two or more spatially separated relay nodes to use the same communication resource sets, wherein one or more mobile terminals is associated with a first relay node, and one or more terminals is associated with a second relay node, at least one of said mobile terminals being associated with both the first relay node and the second relay node;

executable code that receives data scheduled for the at least one of said mobile terminals associated with both the first relay node and the second relay node, at the first relay node and the second relay node in the same resource element; and executable code that transmits the received resource element from the first relay node and the second relay node to the at least one of said mobile terminals associated with both the first relay node and the second relay node.

17. A non-transitory computer readable storage medium storing computer software that enables communication resource reuse among a plurality of relay nodes, the computer software comprising:

executable code that defines a plurality of communication resource sets each resource set comprising one or more communication resource elements, the communication resource sets arranged so that each relay node receives data in a receiving resource set and transmits data in a transmission resource set;

executable code that determines which of two or more relay nodes are spatially separated from one another;

executable code that configures at least two of the two or more spatially separated relay nodes to use the same communication resource sets, wherein one or more mobile terminals is associated with a first relay node, and one or more terminals is associated with a second relay node, at least one of said mobile terminals being associated with both the first relay node and the second relay node;

executable code that disassociates the first relay node from the at least one of said mobile terminals associated with both the first relay node and the second relay node;

executable code that receives data scheduled for the at least one of said mobile terminals at the first relay node and the second relay node in the same resource element; and executable code that transmits the received data from the second relay node to the at least one of said mobile terminals.

* * * * *